US012576904B2

(12) United States Patent (10) Patent No.: US 12,576,904 B2
Nemeth et al. (45) Date of Patent: Mar. 17, 2026

(54) ELECTRIC POWER SUPPLY SYSTEM FOR A VEHICLE AND METHOD FOR CONTROLLING AT LEAST ONE CONSUMER UNIT OF SUCH ELECTRIC POWER SUPPLY SYSTEM

(71) Applicant: KNORR-BREMSE Systeme fuer Nutzfahrzeuge GmbH, Munich (DE)

(72) Inventors: Huba Nemeth, Budapest (HU); David Kiss, Szar (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 18/851,751

(22) PCT Filed: Mar. 7, 2023

(86) PCT No.: PCT/EP2023/055726
§ 371 (c)(1),
(2) Date: Sep. 27, 2024

(87) PCT Pub. No.: WO2023/186466
PCT Pub. Date: Oct. 5, 2023

(65) Prior Publication Data
US 2025/0206368 A1 Jun. 26, 2025

(30) Foreign Application Priority Data

Mar. 29, 2022 (EP) ..................................... 22165076

(51) Int. Cl.
*B62D 5/04* (2006.01)
*B60R 16/03* (2006.01)
(Continued)

(52) U.S. Cl.
CPC ................ *B62D 5/04* (2013.01); *B60R 16/03* (2013.01); *G07C 5/02* (2013.01); *G07C 5/08* (2013.01)

(58) Field of Classification Search
CPC ...... B62D 5/04; B62D 5/0484; B62D 5/0481; B62D 5/046; B60R 16/03; G07C 5/02; G07C 5/08
See application file for complete search history.

(56) References Cited

U.S. PATENT DOCUMENTS 9,346,489 B2 5/2016 Dutsky et al.
10,793,183 B2 10/2020 Harter, Jr. et al.
(Continued)

FOREIGN PATENT DOCUMENTS

EP 2 287 064 A1 2/2011
EP 3 444 919 A1 2/2019
(Continued)

OTHER PUBLICATIONS

International Search Report (PCT/ISA/210) issued in PCT Application No. PCT/EP2023/055726 dated Jun. 2, 2023 (4 pages).
(Continued)

*Primary Examiner* — Lincoln D Donovan
*Assistant Examiner* — Alex W Lam
(74) *Attorney, Agent, or Firm* — Crowell & Moring LLP

(57) ABSTRACT

An electric power supply system for a vehicle includes: at least one consumer unit having a predetermined performance range, at least one main power supply unit configured to supply electric power to the at least one consumer unit via an electric power supply line, and at least one auxiliary power supply unit configured to store a predetermined amount of electric power in at least one auxiliary electrical energy storage unit comprised by the at least one auxiliary power supply unit to supply electric power to the at least one
(Continued)

consumer unit as auxiliary electric power. The electric power supply system and/or the at least one auxiliary power supply unit are/is configured to transmit a signal representative of the instantaneous amount of electric power and energy available from the auxiliary power supply unit to a control unit of the at least one consumer unit, and the control unit is configured to control the at least one consumer unit in accordance with the signal received.

19 Claims, 1 Drawing Sheet

(51) Int. Cl.
  _G07C 5/02_         (2006.01)
  _G07C 5/08_         (2006.01)

(56)                References Cited

U.S. PATENT DOCUMENTS

| | | | |
|---|---|---|---|
| 2011/0040450 A1 | 2/2011 | Izutani et al. | |
| 2013/0127475 A1* | 5/2013 | Sitarski .................. | B60L 58/20 |
| | | | 324/435 |

| | | | |
|---|---|---|---|
| 2013/0147274 A1* | 6/2013 | Ku ........................... | H02J 3/00 |
| | | | 307/31 |
| 2014/0117884 A1 | 5/2014 | Sugiyama et al. | |
| 2014/0222294 A1 | 8/2014 | Sugiyama et al. | |
| 2017/0210413 A1 | 7/2017 | Tsujioka | |
| 2020/0283060 A1 | 9/2020 | Shinoda et al. | |
| 2022/0024514 A1* | 1/2022 | Yokoyama ............. | B62D 5/046 |
| 2022/0063712 A1* | 3/2022 | Kajisawa ............. | B62D 5/0481 |

FOREIGN PATENT DOCUMENTS

| | | |
|---|---|---|
| JP | 2020-142733 A | 9/2020 |
| JP | 2022-23538 A | 2/2022 |
| WO | WO 2009/154119 A1 | 12/2009 |

OTHER PUBLICATIONS

Written Opinion (PCT/ISA/237) issued in PCT Application No. PCT/EP2023/055726 dated Jun. 2, 2023 (7 pages).
European Office Action issued in European Application No. 22 165 076.5 dated Jun. 26, 2025 (7 pages).
Japanese-language Office Action issued in Japanese Application No. 2024-557588 dated Dec. 18, 2025 with English translation (15 pages).

* cited by examiner

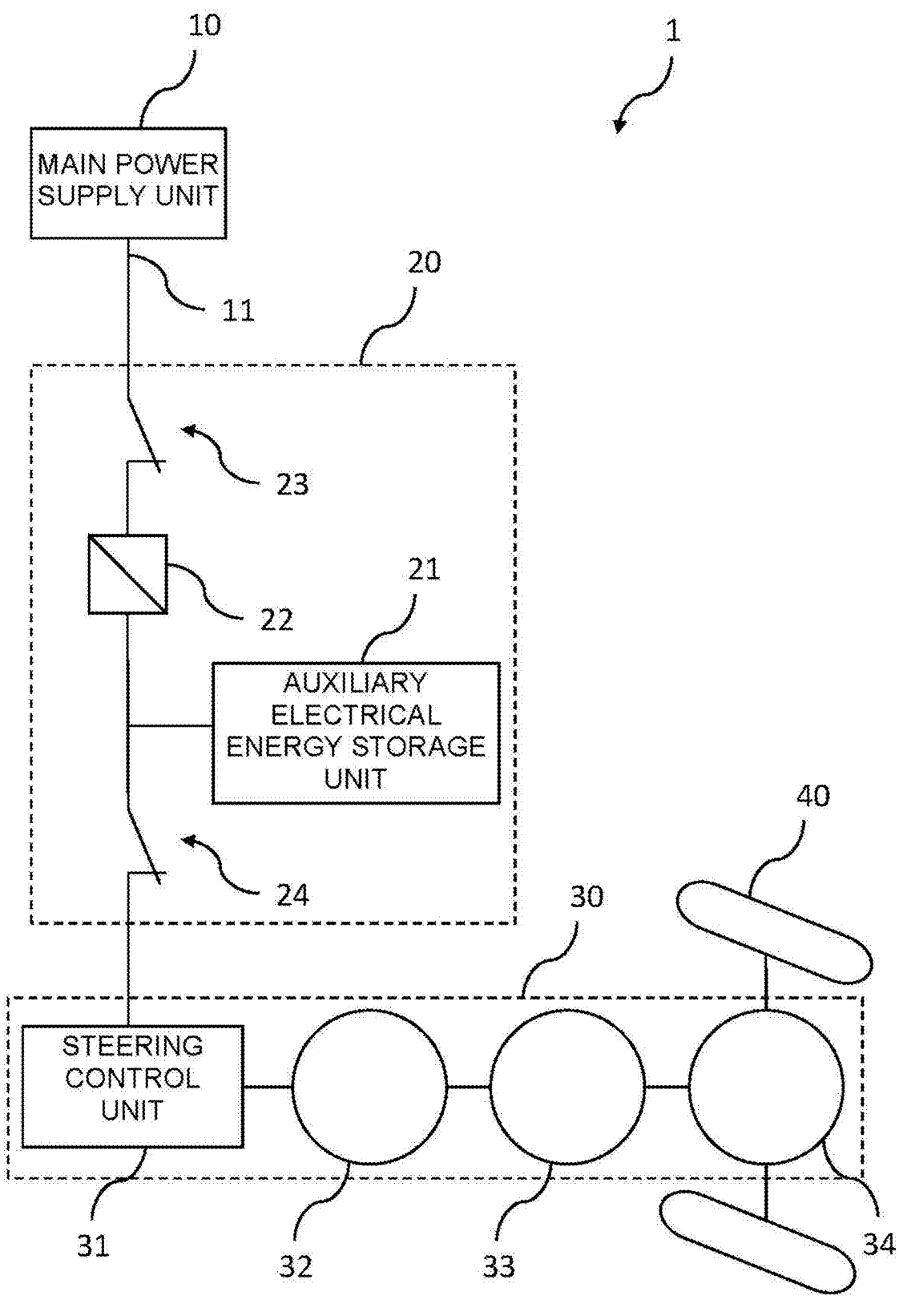

ELECTRIC POWER SUPPLY SYSTEM FOR A VEHICLE AND METHOD FOR CONTROLLING AT LEAST ONE CONSUMER UNIT OF SUCH ELECTRIC POWER SUPPLY SYSTEM

BACKGROUND AND SUMMARY

The present invention relates to an electric power supply system for a vehicle and a method for controlling at least one consumer unit of such electric power supply system. Further, the present invention relates to a vehicle comprising the electric power supply system or being configured to perform the method. The present invention also relates to a computer program product and a storage medium for performing or passing on the method.

Today's vehicles, such as commercial vehicles, comprise assisted steering systems to support or even autonomously execute a steering action as an example of a consumer unit. The assisted steering systems, e.g. a hydraulic torque overlay system, rely on the operation of the internal combustion engine of a respective vehicle. Specifically, the pump, which creates the hydraulic pressure for the assisted steering system is directly connected to the crankshaft of the internal combustion engine. Respective systems are, for example, disclosed in U.S. Pat. No. 10,793,183B2 and U.S. Pat. No. 9,346,489B2.

In the event of a failure, two kinds of backup mechanisms are present in this type of systems. In the event of a hydraulic failure, the system still permits the vehicle to be steered using solely manual efforts. Accordingly, the system permits a driver of the vehicle to take over the steering of a respective wheel. Further, in the event of a failure of the internal combustion engine, the vehicle's kinetic energy can still rotate the crankshaft via the transmission. Consequently, the hydraulic pressure can be maintained to some extent. Since the hydraulic pressure cannot decay immediately, at least if the linings do not burst, a smooth transition to a non-assisted steering operation is assured in the event of a failure.

However, electric power supply systems for vehicles are becoming more and more important to supply consumer units with a required amount of power to ensure operability. Specifically, the electrification in the automotive sector has triggered replacements of several vehicle components resulting in novel architectures. For example, many components of commercial vehicles were used to rely on hydraulic or pneumatic pressure as energy source for control and actuation purposes. Due to the electrification, many of these hydraulic or pneumatic components are to be replaced by electrically powered components. In addition, automated driving applications set new requirements for the vehicle systems and, in particular, for safety relevant consumer units.

With respect to the above given example of an assisted steering system as consumer unit, if the energy source of the assisted steering system will be electrical, the direct mechanical connection to the crankshaft, therefore the ability to use the vehicle kinetic energy as a fallback will be lost. In the event of power supply failure, the electrical input power provided for assisting the steering motion could be lost abruptly and thus does not allow a smooth or gradual transition from an assisted steering to a manual driver steering modus. This could lead to an unsafe scenario, in particular if this happens during e.g. changing of the steering radius or while maintaining a constant steering angle when the vehicle is in motion.

In view of the above, it is an object of the present invention to provide an electric power supply system for a vehicle allowing to assure a smooth steering derating in an electric vehicle.

The object is solved by the subject matters of the independent claims. Advantageous modifications are subject to the dependent claims.

According to the present invention, an electric power supply system for a vehicle comprises at least one consumer unit comprising a predetermined performance range, at least one main power supply unit configured to supply electric power to the at least one consumer unit via an electric power supply line, and at least one auxiliary power supply unit configured to store a predetermined amount of electric energy in at least one auxiliary electrical energy storage unit comprised by the at least one auxiliary power supply unit to supply electric power to the at least one consumer unit as auxiliary electric power. The electric power supply system and/or the at least one auxiliary power supply unit are/is configured to transmit a signal representative of the instantaneous amount of electric power and energy available from the auxiliary power supply unit to a control unit of the at least one consumer unit. Further, the control unit is configured to control the at least one consumer unit in accordance with the signal received.

The at least one consumer unit is a consumer unit of the vehicle requiring electric power to execute a function or set of functions assigned to the consumer unit. Accordingly, the at least one consumer unit comprises a predetermined performance range with respect to the function or set of functions as such and/or a performance of such function or functions. In other words, the performance range may comprise the number of functions and/or the range of operability of a respective function. For example, the predetermined performance range may comprise functions A and B with function A providing an operability of providing a driving power for a subcomponent in a predetermined range, and with function B providing an operability of providing a driving power for another subcomponent in another or the same predetermined range. The predetermined performance range may be assumed as the performance range of the respective consumer unit during normal operation, i.e. without any failure of the electric power supply system. The predetermined performance range may be adaptable, for example, in accordance with an instantaneous operating mode, an instantaneous driving maneuver and/or driver monitoring data. The operation mode may relate to a preset configuration with respect to a general operation mode of a vehicle, such as an autonomous driving mode, an assisted driving mode, a parking mode or the like. The instantaneous driving maneuver may relate to a specific driving route, such as predetermined by a navigation system, comprising consideration of a distance to be travelled, the number of steering maneuvers, expected speeds, expected accelerations, expected decelerations, road conditions or the like. Alternatively or in addition, the instantaneous driving maneuver may relate to actual data, such as an instantaneous speed, an instantaneous acceleration, an instantaneous deceleration, an instantaneous steering maneuver, instantaneous road conditions or the like. The driver monitoring data may relate to the actual or average driving characteristics of a driver, such as an intensity and/or a number of used functions of a consumer unit by the driver. For example, a driver may use a braking system as consumer unit frequently but usually with relatively low braking forces to be applied, while another driver may use the braking system very rarely but usually with high braking forces in such event. As another example, a driver may usually apply relatively low manual forces on a steering system, while another driver may usually apply high forces on the steering system irrespective of any steering assistance. In the latter event, the predetermined performance range of the steering system may be lowered with respect to an assistance function.

During normal operation, the at least one main power supply unit may supply the required electric power to the at least one consumer unit via the power supply line. The power supply by the main power supply unit may be directly via the power supply line or indirectly via further components arranged in the power supply line between the at least one main power supply unit and the at least one consumer. If the at least one main power supply unit fails to supply sufficient electric power to the at least one consumer unit or does not supply any further electric power at all, the at least one auxiliary power supply unit is configured to supply electric power and energy available from the respective auxiliary power supply unit to the respective consumer unit as auxiliary electric power. The electric power and energy available from the respective auxiliary power supply unit corresponds to the total electrical energy stored in the at least one auxiliary electrical energy storage unit. Accordingly, if the auxiliary power supply unit comprises one auxiliary electrical energy storage unit, the electric power and energy available from the respective auxiliary power supply unit corresponds to the electrical energy stored in the one auxiliary electrical energy storage unit. In turn, if the auxiliary power supply unit comprises several auxiliary electrical energy storage units, the electric power and energy available from the respective auxiliary power supply unit corresponds to the sum of the electrical energy stored in the several auxiliary electrical energy storage units. For example, the at least one auxiliary electrical energy storage unit may be a battery or a capacitor or may comprise at least one battery or at least one capacitor.

However, the availability of the auxiliary electric power for the respective consumer unit is limited in accordance with the instantaneous amount of electric power and energy available from the auxiliary power supply unit. Accordingly, the control unit to control the at least one consumer unit is configured to control the at least consumer unit in accordance with the availability of the auxiliary electric power, i.e. in accordance with the instantaneous amount of electric power and energy available from the auxiliary power supply unit. Therefore, the signal representative of the instantaneous amount of electric power and energy available from the auxiliary power supply unit is transmitted to the control unit.

Said signal may be transmitted by the auxiliary power supply unit. For example, the auxiliary power supply unit may comprise a respective measurement unit or at least one sensor, respectively, to detect the instantaneous amount of electric power and energy available from the auxiliary power supply unit. Alternatively or in addition, the auxiliary power supply unit may comprise a microprocessor or the like that may be configured to estimate a consumption of the amount of electric power and energy available from the auxiliary power supply unit to derive a remaining amount of electric power and energy available from the auxiliary power supply unit therefrom.

Further, alternatively or in addition, the signal representative of the instantaneous amount of electric power and energy available from the auxiliary power supply unit may be generated by the electric power supply system by a component thereof other than the auxiliary power supply unit. For example, a power meter arranged in the power supply line between the auxiliary power supply unit and the at least one consumer may detect the power consumption as of the time the main power supply unit fails. Based on the predetermined amount of electric power and energy available from the auxiliary power supply unit and the power consumption a remaining amount of electric power and energy available from the auxiliary power supply unit may be derived. Alternatively or in addition, the electric power supply system may comprise a monitoring device to detect a failure of the main power supply unit. Based on the predetermined amount of electric power and energy available from the auxiliary power supply unit and a power consumption, e.g. estimated based on average consumption data and/or actual driving operations, a remaining amount of electric power and energy available from the auxiliary power supply unit may be derived by the monitoring device or the control unit.

Any additional generation of said signal by different units of the electric power supply system may be used for plausibility checks and/or for redundancy reasons.

In some embodiments, the control is configured to derate the predetermined performance range of the at least one consumer unit in response to said received signal down to a predetermined level or a lower level in accordance with the received signal, in particular over a predetermined period of time.

The derating of the predetermined performance range of the respective consumer unit may be a reduction in the number of functions or in the performance of the respective function. Specifically with respect to the reduction in the performance of a respective function, the derating may relate to a function in which a derating is noticeable by a driver. Accordingly, the driver becomes aware of the derating and therefore an upcoming loss of the function, when the auxiliary power supply unit will be depleted. Alternatively or in addition, another kind of warning, like a visual, acoustical and/or tactile notice, is provided to the driver. Since the predetermined performance range is derated to a derated performance range, the functionality of the at least one consumer unit is not abruptly stopped. Consequently, the electric power supply system according to the invention provides the driver with sufficient time to react on a failure of the power supply.

The derating of the predetermined performance range down to a predetermined level or a lower level in accordance with the received signal may be a smooth reduction of the performance of a function of the respective consumer unit. The performance of the function may thereby be derated down to zero. The performance level of the function may also be derated down to a predetermined or lower level, which may preserve a minimum performance for safety reasons. However, such safety level may only be temporarily available. Nevertheless, the time to provide such safety level may be sufficient to react and/or to complete a driving distance, such as to arrive at a destination according to a setting in a navigation system.

The derating may be a derating over a predetermined period of time. The predetermined period of time may be a minimum period of time to allow a driver to react on the derating. Alternatively or in addition, the predetermined period of time may be set in accordance with an expected power consumption by the consumer unit. Alternatively or in addition, the predetermined period of time may be set in accordance with the predetermined amount of power and energy available from the auxiliary power supply unit and/or the instantaneous amount of power and energy available from the auxiliary power supply unit.

In some embodiments, the control unit is configured to derate the predetermined performance range as a linear, degressive, progressive or customized function of the instantaneous electric power and energy available from the auxiliary power supply unit.

To provide the driver with a smooth reduction in the performance range of the at least one consumer, the derating may be a function of the instantaneous amount of electric power and energy available from the auxiliary power supply unit. Accordingly, the derating increases with a decrease in the instantaneous amount of electric power and energy available from the auxiliary power supply unit.

The derating may be executed as a linear function of the instantaneous amount of electric power and energy available from the auxiliary power supply unit. Alternatively, the function may be degressive, for example, to support the driver's recognition of the derating and therefore upcoming failure of the power supply at the beginning of the derating. Alternatively, the function may be progressive to support the indication of urgency for the driver to react as the instantaneous amount of electric power and energy available from the auxiliary power supply unit further decreases, in particular approaches zero. Further, a customized function, which may be a combination of at least two of the above functions, may be applied to the derating of the performance range, specifically the derating of the performance of a particular function of the at least one consumer unit.

The respective function to be applied to the derating may be selected by the control unit in accordance with the instantaneous operating mode, the instantaneous driving maneuver and/or driver monitoring data.

In some embodiments, the control unit is further configured to control the at least one consumer unit in dependence of the instantaneous performance status and/or temperature of the auxiliary power supply unit.

The performance status of the auxiliary power supply unit may be a degradation status of the auxiliary power supply unit, which may lower the predetermined amount of electrical energy storable in the auxiliary power supply unit. Alternatively or in addition, the performance status may also relate to a status of the auxiliary supply unit indicative of an upcoming failure of the auxiliary power supply unit. Such status may be derivable from a temperature of the auxiliary power supply unit. However, the temperature may also be indicative of another effect with respect to the electric power supply to the at least one consumer.

In response to the instantaneous performance status and/or temperature of the auxiliary power supply unit indicative of a negative influence, the control unit may accelerate a derating or adapt an already applied derating to be accelerated. In turn, the control unit may be configured to decelerate a derating or adapt an already applied derating to be decelerated, if the performance status is improved or the temperature lowers.

In some embodiments, the control unit is further configured to control the at least one consumer unit in dependence of an instantaneous operating mode, an instantaneous driving maneuver and/or driver monitoring data.

Similar to the selection of a respective function to be applied to the derating, the control unit controls the at least one consumer unit in accordance with the instantaneous operating mode, the instantaneous driving maneuver and/or driver monitoring data. Such control may relate to the derating of the number of functions and their respective performance. For example, frequently accessed and/or safety-relevant functions by the driver may be derated slowly, while other functions are shut-off or derated faster.

The categorization in frequently accessed and/or safety-relevant functions may also depend on the instantaneous operating mode, the instantaneous driving maneuver and/or driver monitoring data.

In some embodiments, the auxiliary power supply unit is arranged in or connected to the electric power supply line between the at least one main power supply unit and the at least one consumer unit.

In such arrangement, the at least one auxiliary electrical energy storage unit of the auxiliary power supply unit may be chargeable by the main power supply unit.

In some embodiments, the auxiliary power supply unit is arranged in the electric power supply line. Further, at least one upstream switch with respect to a power supply direction from the at least one main power supply unit to the at least one consumer unit is arranged in the electric power supply line between the at least one main power supply unit and the auxiliary power supply unit.

The at least one upstream switch may be configured to disconnect the auxiliary power supply unit from the at least one main power supply unit. Such disconnection may be due to a failure of the main power supply unit and/or a failure of the auxiliary power supply unit.

Alternatively or in addition, at least one downstream switch with respect to a power supply direction from the at least one main power supply unit to the at least one consumer is arranged in the electric power supply line between the auxiliary power supply unit and the at least one consumer unit.

The at least one downstream switch may be configured to disconnect the auxiliary power supply unit from the at least one consumer. Such disconnection may be due to a failure of the auxiliary power supply unit and/or a failure of the at least one consumer.

The switching of the upstream switch and/or downstream switch may be controlled by the switch comprising hardware components and/or an internal intelligence like a microprocessor to react on a specific electrical signal representative of, for example, an overcurrent, overvoltage, undercurrent and/or undervoltage. Alternatively or in addition, the switching of the upstream switch and/or downstream switch may be controlled by an external control device such as the control unit to control the at least one consumer or another external control unit in operative connection to the upstream switch and/or downstream switch.

In an exemplary configuration with upstream and downstream switch arranged in the power supply line and the auxiliary power supply unit being arranged therebetween, both the upstream and the downstream switch may be closed during normal operation of the electric power supply system. Accordingly, the at least one main power supply unit supplies power to the at least one consumer unit and charges the auxiliary power supply unit or the at least one auxiliary electrical energy storage unit, respectively. Upon a detection of a failure of the at least one main power supply unit, e.g. an undercurrent, the upstream switch opens and disconnects the main power supply unit from the auxiliary power supply unit and the at least one consumer unit. Due to the disconnection, the at least one consumer unit receives the required electric power from the auxiliary power supply unit until the at least one auxiliary electrical energy storage unit is depleted or the main power supply unit is reconnected by the upstream switch. During the power supply by the auxiliary power supply unit, the control unit derates the performance range of the at least one consumer unit to allow a smooth derating of a respective functionality. During an operating mode of the vehicle not requiring operation of the at least one consumer, the downstream switch may be opened while the upstream switch is closed to charge the at least one auxiliary electrical energy storage unit without any influence by the at least one consumer unit.

In some embodiments, the at least one upstream switch and/or the at least one downstream switch is comprised by the auxiliary power supply unit.

The auxiliary power supply unit may thereby form an auxiliary power supply unit module to be easily implemented in an existing electric power supply system with switching capabilities adapted to the respective auxiliary power supply unit.

In some embodiments, the auxiliary power supply unit comprises a converter. The converter is preferably arranged between the at least one upstream switch as described above and the auxiliary electrical energy storage unit.

Similar as per the above, the converter may be part of a respective auxiliary power supply unit module adapted to the at least one consumer unit irrespective of the type of electric power of the main power supply unit.

In some embodiments, the at least one consumer unit is a steering gear unit configured to at least assist a steering of at least one wheel of an axle of a vehicle.

The steering gear unit may be configured to assist or autonomously execute a steering function to steer at least one wheel of a vehicle. In such configuration, for example, if the main power supply unit for the steering gear unit fails, the auxiliary power supply unit is activated to supply the stored auxiliary electric power to the steering gear unit.

The control unit may derate the steering assistance in accordance with the instantaneous amount or a predetermined amount of electric power and energy available from the auxiliary power supply unit. The instantaneous amount of electric power and energy available from the auxiliary power supply unit may allow a more precise control of the derating. However, assuming that the auxiliary power supply unit has stored the predetermined amount of electric power and energy when the main power supply unit fails may allow a simplified estimation of the remaining electric power over time to control the derating. In other words, remaining electric power over time to control the derating is estimated based on the predetermined amount of electric power and an expected power consumption instead of being detected. In response to the amount of electric energy available by the auxiliary power supply unit, the control unit derates the performance range of the steering gear unit such as a steering assistance level. The steering assistance level is derated in a smooth way, thus providing a driver with sufficient time to safely handle the vehicle in the event of sudden, unexpected shut down of the main power supply unit of the assisted steering.

In some embodiments, the control unit is a steering control unit configured to derate a steering assistance for the at least one wheel of the axle.

As the steering control unit is configured to derate the steering assistance for the at least one wheel of the axle any further external control unit may be omitted. The steering control unit thus requires only a respective input terminal or receiver to receive the signal representative of the instantaneous and/or predetermined amount of electric power and energy available from the auxiliary power supply unit. The predetermined amount of electric power and energy available from the auxiliary power supply unit may also be stored in the steering control unit. Via the same way of communication the steering control unit may receive information on a failure of the main power supply unit to initiate a respective derating. Alternatively or in addition, such information may be provided via a separate input terminal or receiver. The steering control unit may also be configured to detect the failure of the main power supply unit, e.g. based on a current or voltage decrease or drop.

According to another aspect, the present invention relates to a method for controlling at least one consumer unit of an electric power supply system as described above. The method comprises the steps of:

determining an instantaneous amount of electric power and energy available from the auxiliary power supply unit, transmitting a signal representative of the instantaneous amount of electric power and energy available from the auxiliary power supply unit to the control unit, and controlling the at least one consumer unit by the control unit in accordance with the received signal.

The instantaneous amount of electric power and energy available from the auxiliary power supply unit may be determined by being detected and/or estimated as previously described. The respective signal is transmitted to the control unit to control the at least one consumer unit by the control unit in accordance with the received signal, in particular, by derating the performance range of the at least one consumer.

In some embodiments, the signal representative of the instantaneous amount of electric power and energy available from the auxiliary power supply unit is transmitted continuously to the control unit.

The continuous transmittance of the signal representative of the instantaneous amount of electric power and energy available from the auxiliary power supply unit to the control unit allows a precise control and/or adaption of the performance range. For example, a derating may be decelerated if the instantaneous amount of electric power is more than expected after the derating has been started. In turn, the derating may be accelerated if the instantaneous amount of electric power is less than expected after the derating has been started. Alternatively, the signal representative of the instantaneous amount of electric power and energy available from the auxiliary power supply unit may be transmitted only once after failure of the main power supply, periodically or on demand to the control unit. The transmission rate may also be adaptable, e.g. in accordance with the instantaneous operating mode, the instantaneous driving maneuver and/or driver monitoring data.

In some embodiments, the control unit derates the performance range of the at least one consumer unit down to a derated performance range over a predetermined period of time, when the instantaneous amount of electric power and energy available from the auxiliary power supply unit falls below a predetermined threshold, wherein the predetermined period of time, the derating function and/or the derated performance range is adaptable.

Accordingly, the derating of the performance range may not be initiated immediately after a failure of the main power supply unit but only after the instantaneous amount of electric power and energy available from the auxiliary power supply unit falls below a predetermined threshold. This may be advantageous if the auxiliary power supply unit is configured to store a relatively high amount of electric energy. In such event, it may be assumed that the stored amount of energy is sufficient to complete a driving maneuver or the like without the requirement of derating the performance range. However, if the instantaneous amount of electric power and energy available from the auxiliary power supply unit falls below the predetermined threshold, the control unit derates the performance range. The predetermined threshold may be a minimum amount of electric energy for a predetermined period of time and/or predetermined operations to safely stop the vehicle.

In principle, any method features and/or device features representative of method steps as described with respect to electric power supply system also relate to further embodiments of the method and are therefore applicable thereto. In turn, any method features and/or device features representative of a feature of the electric power supply system as described with respect to the method also relate to further embodiments of the electric power supply system and are therefore applicable thereto.

According to another aspect, the present invention relates to a vehicle. The vehicle comprises an electric power supply system as previously described or is configured to perform the method as previously described.

The vehicle may be a commercial vehicle. For example, with respect to a steering system as consumer, as a manual steering operation of a commercial vehicle requires relatively high efforts by a driver due to the comparably high loads, the proposed assurance of a smooth transition from an assisted steering to a non-assisted steering operation provides a safety-relevant improvement.

The vehicle preferably comprises individual features listed in the above description of the electric power supply system and/or the method.

According to another aspect, the present invention relates to a computer program product having code means, which, when being executed on a data processing unit, cause it to execute the method as described above.

The data processing unit is preferably a data processing unit provided in the above-described electric power supply system, such as the control unit or another control unit. Thus, also an existing device may be adapted to perform the method described above.

According to another aspect, the present invention relates to a storage medium for being read by a data processing unit, wherein the storage medium comprises a computer program product as described above.

Thereby, the present invention may be passed on. The storage medium preferably comprises an USB stick, a memory card and/or a CD-ROM.

The following is a description of preferred embodiments of the invention with reference to the accompanying drawing.

BRIEF DESCRIPTION OF THE DRAWING

FIG. 1 is a schematic illustration of an electric power supply system according to an exemplary embodiment of the present invention.

DETAILED DESCRIPTION OF THE DRAWING

FIG. 1 is a schematic illustration of an electric power supply system 1 according to an exemplary embodiment of the present invention. The electric power supply system 1 comprises a vehicle battery with 24V electric power as main power supply unit 10, an auxiliary power supply unit 20 and a steering gear unit 30 configured to at least assist a steering of the wheels of an axle 40 and representative of the at least one consumer unit. The steering gear unit 30 comprises a steering control unit 31 as an exemplary control unit, an electric motor 32 as exemplary consumer drive to be controlled by the steering control unit 31 and a transmission 33 to convert the rotational speed of the electric motor 32 in an actuation of a subsequent steering mechanism 34 as an exemplary consumer actuator to steer the wheels of the axle 40.

The main power supply unit 10 supplies electric power to the steering gear unit 30 via an electric power supply line 11. The auxiliary power supply unit 20 is arranged in the electric power supply line 11 between the main power supply unit 10 and the steering gear unit 30. The auxiliary power supply unit 20 comprises an auxiliary electrical energy storage unit 21, a converter 22, an upstream switch 23 and a downstream switch 24. The auxiliary electrical energy storage unit 21 is connected to the power supply line 11 or a supply line of the auxiliary power supply unit 20 as continuation of the power supply line 11, respectively. The supply line of the auxiliary power supply unit 20 as continuation of the power supply line 11 is to be understood as part of the power supply line 11. The upstream switch 23 is arranged in the power supply line 11 between the main power supply unit 10 and the auxiliary electrical energy storage unit 21. The downstream switch 24 is arranged in the power supply line 11 between the auxiliary electrical energy storage unit 21 and the steering gear unit 30. The converter 22 is arranged in the power supply line 11 between the upstream switch 23 and the auxiliary electrical energy storage unit 21. The converter 22 is configured to convert the 24V power of the main power supply unit 10 to an electric power adapted to the steering gear unit 30 and the auxiliary power supply unit 20.

During normal operation of the main power supply 10 in an operational mode of a vehicle, the upstream switch 23 and the downstream switch 24 are closed to supply the steering gear unit 30 with the electric power by the main power supply unit 10. Further, the auxiliary electrical energy storage unit 21 may thereby be charged in parallel up to a predetermined amount of electric power. If the main power supply unit 10 fails, the electric power and energy available from the auxiliary power supply unit 20 or the auxiliary electrical energy storage unit 21, respectively, is supplied to the steering gear unit 30 instead. However, as the available amount of electric power and energy by the auxiliary power supply unit 20 is limited as long as no recharge is possible, the steering control unit derates the performance range of the electric motor 32 as a function of the instantaneous amount of electric energy stored in the auxiliary power supply unit 20. Accordingly, the auxiliary power supply unit 20 continuously communicates instantaneous amount of electric energy stored in the auxiliary power supply unit 20, e.g. the instantaneous available power capacity and power capability, to the steering control unit 31.

In an alternative embodiment, the supply of electric power to the steering gear unit 30 may be restricted to the auxiliary power supply unit 20 even during normal operation. However, in such configuration, the main power supply unit 10 is connected to the auxiliary power supply unit 20 to always charge the auxiliary electrical energy storage unit 21 up to a predetermined amount of electric power and energy. In the event of a failure of the main power supply unit 10 the effect for the power supply to the steering gear unit 30 is the same, i.e. the further power supply is restricted to the amount of electric power and energy available from the auxiliary power supply unit 20.

The invention is not limited to the embodiments described above. Rather, by combining, omitting and/or exchanging individual features, further subject matters may be formed, which also fall within the claimed scope of protection. Further, the consumer unit may be a braking unit or a HAD unit.

LIST OF REFERENCE SIGNS 1 electric power supply system
10 main power supply unit
11 electric power supply line
20 auxiliary power supply unit
21 auxiliary electrical energy storage unit
22 converter
23 upstream switch
24 downstream switch
30 steering gear unit (consumer unit)
31 steering control unit (control unit)
32 electric motor (consumer drive)
33 transmission
34 steering mechanism (consumer actuator)
40 axle

The invention claimed is:

1. An electric power supply system for a vehicle, comprising:
   at least one consumer unit having a predetermined performance range;
   at least one main power supply unit configured to supply electric power to the at least one consumer unit via an electric power supply line; and
   at least one auxiliary power supply unit configured to store a predetermined amount of electric power in at least one auxiliary electrical energy storage unit of the at least one auxiliary power supply unit to supply electric power to the at least one consumer unit as auxiliary electric power, wherein
   the electric power supply system and/or the at least one auxiliary power supply unit are/is configured to transmit a signal representative of an instantaneous amount of electric power and energy available from the auxiliary power supply unit to a control unit of the at least one consumer unit, and
   the control unit is configured to control the at least one consumer unit in accordance with the signal received.

2. The electric power supply system according to claim 1, wherein
   the control unit is configured to derate the predetermined performance range of the at least one consumer unit in response to said received signal down to a predetermined level or a lower level in accordance with the signal received.

3. The electric power supply system according to claim 2, wherein
   the control unit is configured to derate the predetermined performance range of the at least one consumer unit over a predetermined period of time.

4. The electric power supply system according to claim 2, wherein
   the control unit is configured to derate the predetermined performance range as a linear, degressive, progressive or customized function of the instantaneous electric power and energy available from the auxiliary power supply unit.

5. The electric power supply system according to claim 1, wherein
   the control unit is further configured to control the at least one consumer unit in dependence on at least one of the instantaneous performance status and temperature of the auxiliary power supply unit.

6. The electric power supply system according to claim 1, wherein
   the control unit is further configured to control the at least one consumer unit in dependence on at least one of an instantaneous operating mode, an instantaneous driving maneuver, and driver monitoring data.

7. The electric power supply system according to claim 1, wherein
   the auxiliary power supply unit is arranged in or connected to the electric power supply line between the at least one main power supply unit and the at least one consumer unit.

8. The electric power supply system according to claim 7, wherein
   the auxiliary power supply unit is arranged in the electric power supply line, and
   at least one upstream switch with respect to a power supply direction from the at least one main power supply unit to the at least one consumer unit is arranged in the electric power supply line between the at least one main power supply unit and the auxiliary power supply unit, and/or
   at least one downstream switch with respect to a power supply direction from the at least one main power supply unit to the at least one consumer is arranged in the electric power supply line between the auxiliary power supply unit and the at least one consumer unit.

9. The electric power supply system according to claim 8, wherein
   at least one of the at least one upstream switch and the at least one downstream switch is part of the auxiliary power supply unit.

10. The electric power supply system according to claim 1, wherein
   the auxiliary power supply unit comprises a converter.

11. The electric power supply system according to claim 8, wherein
   the auxiliary power supply unit comprises a converter.

12. The electric power supply system according to claim 11, wherein
   the converter is arranged between the at least one upstream switch and the auxiliary electrical energy storage unit.

13. The electric power supply system according to claim 1, wherein
   the at least one consumer unit is a steering gear unit configured to at least assist a steering of at least one wheel of an axle of a vehicle.

14. The electric power supply system according to claim 13, wherein
   the control unit is a steering control unit configured to derate a steering assistance for the at least one wheel of the axle.

15. A method for controlling at least one consumer unit having a predetermined performance range of an electric power supply system, the electrical supply system including:
   at least one main power supply unit configured to supply electric power to the at least one consumer unit via an electric power supply line; and
   at least one auxiliary power supply unit configured to store a predetermined amount of electric power in at least one auxiliary electrical energy storage unit of the at least one auxiliary power supply unit to supply electric power to the at least one consumer unit as auxiliary electric power,
   the method comprising the steps of:
      determining an instantaneous amount of electric power and energy available from the auxiliary power supply unit;

transmitting a signal representative of the instantaneous amount of electric power and energy stored in the auxiliary power supply unit to the control unit; and controlling the at least one consumer unit by the control unit in accordance with the transmitted signal.

16. The method according to claim 15, wherein the signal representative of the instantaneous amount of electric power and energy available from the auxiliary power supply unit is transmitted continuously to the control unit.

17. The method according to claim 15, wherein the control unit derates the performance range of the at least one consumer unit down to a derated performance range over a predetermined period of time, when the instantaneous amount of electric power and energy available from the auxiliary power supply unit falls below a predetermined threshold, wherein at least one of the predetermined period of time, the derating function, and the derated performance range is adaptable.

18. A vehicle comprising an electric power supply system according to claim 1.

19. A computer product comprising a non-transitory computer readable medium having program code which, when executed on a data processing unit in an electric power supply system including at least one consumer unit with a predetermined performance range; at least one main power supply unit configured to supply electric power to the at least one consumer unit via an electric power supply line; and at least one auxiliary power supply unit configured to store a predetermined amount of electric power in at least one auxiliary electrical energy storage unit of the at least one auxiliary power supply unit to supply electric power to the at least one consumer unit as auxiliary electric power, causes the acts of:

determining an instantaneous amount of electric power and energy available from the auxiliary power supply unit;

transmitting a signal representative of the instantaneous amount of electric power and energy stored in the auxiliary power supply unit to the control unit; and controlling the at least one consumer unit by the control unit in accordance with the transmitted signal.

* * * * *